June 12, 1951 C. S. REITAN Re. 23,378
POWER RAKE
Original Filed Oct. 25, 1947 2 Sheets-Sheet 1
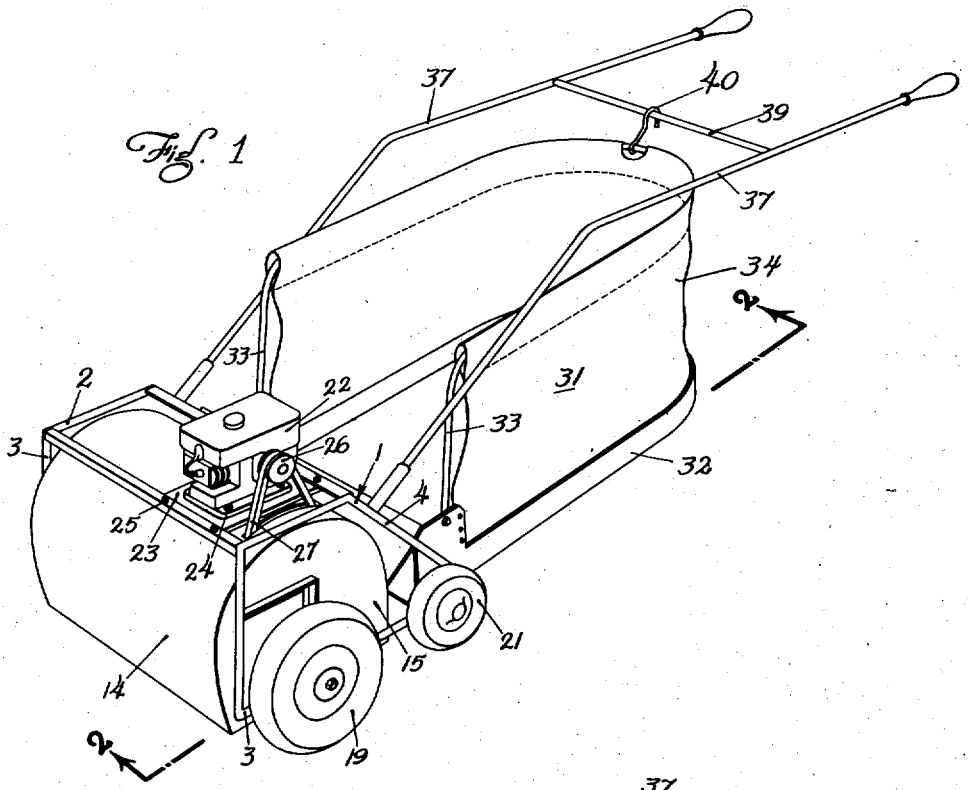
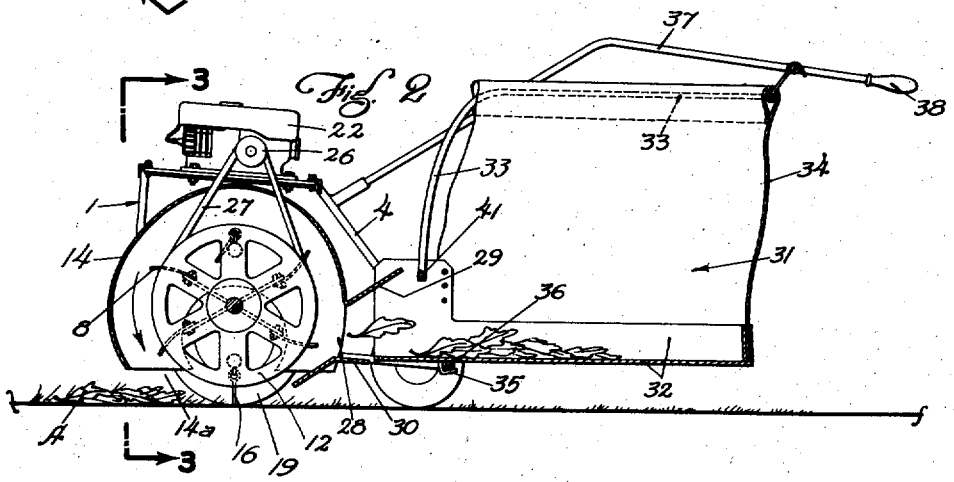
Inventor
Claude S. Reitan
By his Attorneys
Merchant & Merchant June 12, 1951 C. S. REITAN Re. 23,378

POWER RAKE

Original Filed Oct. 25, 1947 2 Sheets-Sheet 2

Inventor
Claude S. Reitan
By his Attorneys
Merchant & Merchant

Reissued June 12, 1951

Re. 23,378

UNITED STATES PATENT OFFICE 23,378

POWER RAKE

Claude S. Reitan, Fergus Falls, Minn.

Original No. 2,505,576, dated April 25, 1950, Serial No. 782,128, October 25, 1947. Application for reissue May 18, 1950, Serial No. 162,794

8 Claims. (Cl. 56—27)

Matter enclosed in heavy brackets [ ] appears in the original patent but forms no part of this reissue specification; matter printed in italics indicates the additions made by reissue.

My invention relates to devices for raking leaves and, more particularly, to power-driven devices for this purpose.

An important object of my invention is the provision of a device of the type immediately above-described, which is capable of picking up leaves and the like even after they have become matted and heavy with moisture.

Another object of my invention is the provision of a device which can be pushed over rocks and the like without fear of damage to any moving parts.

Another object of my invention is the provision of a power-driven raker for leaves and the like, which is inexpensive to build, rugged in construction, and which requires but a minimum of adjustment and care.

The above and numerous other objects of my invention will become apparent from the following detailed specification, appended claims, and attached drawings.

Referring to the drawings, wherein like characters indicate like parts throughout the several views:

Fig. 1 is a perspective view of my novel device;

Fig. 2 is a longitudinal section taken substantially on the line 2—2 of Fig. 1;

Figure 6:
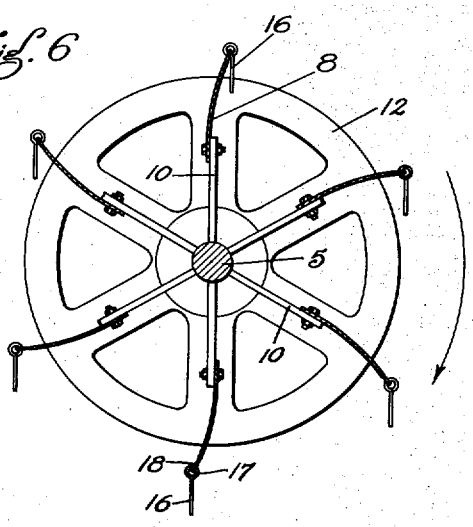
Fig. 6 is a view corresponding substantially to a portion of Fig. 2 on an enlarged scale, but illustrating a modified form of my invention.
Figure 4:
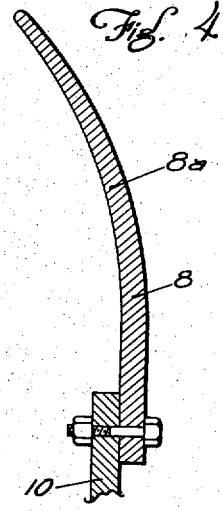
Fig. 4 is an enlarged fragmentary section taken on the line 4—4 of Fig. 3.
Figure 3:
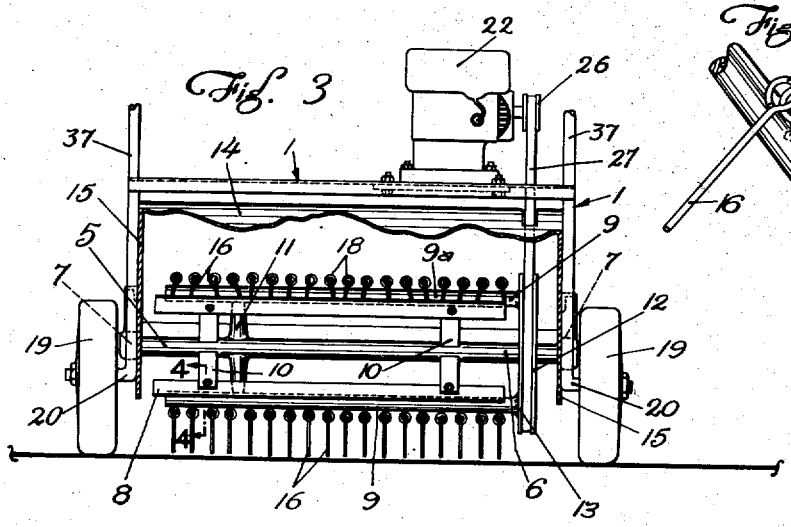
Fig. 3 is a view partly in section and partly in front elevation, taken on the line 3—3 of Fig. 2, some parts being broken away.
Figure 5:
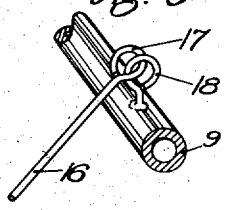
Fig. 5 is a fragmentary perspective view showing a detail of one of the pick-up fingers of my device.

Referring with greater particularity to the drawings, the numeral 1 indicates, in its entirety, a skeleton-like frame comprising a rectangular top member 2, side members 3, and rear frame members 4.

A rotary member is indicated, in its entirety, by the numeral 5 and comprises a shaft 6 (journalled in suitable bearings 7 in the side frame members 3), a plurality of circumferentially-spaced radially-projecting fan blades 8, and a plurality of circumferentially-spaced axially-extended pick-up members 9. It will be noted that the fan blades 8 are secured to the shaft 6 by means of radially-projecting arms 10 and that the pick-up elements 9 are secured to the shaft 6 by means of radial arms 11, adjacent one end, and at their opposite ends are welded or otherwise secured to a pulley 12, as indicated at 13. The pulley 12 is fast on the shaft 6 for common rotation therewith. The whole rotary member 5, including the pulley 12, is contained within a segmental hood 14 having end plates 15 through which the shaft 6 extends into the bearings 7. The hood 14, at its bottom portion, is provided with an elongated opening 14a, immediately overlying the ground surface, and through which the elements 8 and 9 are adapted to operate.

Pick-up elements 9, preferably and as shown, are made up of any axially-extended member such as the rods 9a radially outwardly spaced from the shaft 6, and pick-up fingers 16 which are formed at their inner ends with ring-like loops or eyes 17, which are loosely engaged by similar loops 18 secured fast in axially spaced relation on the rods 9a.

The frame 1 and the hood 14 carried thereby are maintained in spaced relation to the ground by means of wheels 19 journalled on shafts 20, which shafts 20 are rigidly secured to the intermediate portion of the frame 1, and also by means of smaller wheels 21 suitably secured to the rear end of the frame. A motor 22 is rigidly secured to a mounting plate 23 by means of bolts or the like 24. Mounting plate 23, is, in turn, rigidly secured to the rectangular top frame member 2 by means of bolts or the like 25. Motor 22 is provided with a pulley 26 over which runs a V-belt or the like 27. Likewise, belt 27 runs over the pulley 12. As indicated in Fig. 2, pulley 12 is rotated in a counterclockwise direction. It will be noted that, when the pick-up fingers 16 are in a radially-extended position, they extend radially outwardly beyond the outer edges of the fan blades 8. Fan blades 8, preferably and as shown, are provided with forwardly-extending scoop-acting arcuate tips 8a at their radially outer ends.

Immediately behind the elongated opening 14a in the direction of rotation of the rotary member 5, is a delivery spout 28 formed by a rearwardly and upwardly-extending lip *29*, preferably and as shown formed integrally with the segmental hood 14, and an angular plate 30 secured at its opposite ends to the end plates 15. Spout 28 delivers into a suitable basket 31, preferably detachably carried by the frame 1, and, as shown, comprising a base member 32, a substantially U-shaped upper frame member 33 and a wall-forming member 34, preferably made from canvas or the like. The base member 32 is provided with an angle bracket 35, which is adapted to be placed over and supported on a transverse bar 36 which forms a portion of the rear frame structure 4. A pair of handle bars 37 extend upwardly and rearwardly from the rear frame structure 4, are provided at their extreme rear ends with hand grips 38, and are joined at their intermediate portions by a cross bar 39. It will be seen by reference to Figs. 1 and 2, that the basket 31 is supported at its rear end from the cross bar 39 by a hook 40. The upper U-shaped frame member 33, at its forward end portions, extends downwardly to engage, preferably movably, the forward end portions of the base member 32, as indicated at 41.

From the above, it will be obvious that, as the rotary member 5 is rotated counterclockwise with respect to Fig. 2, the pick-up fingers 16 will be swung to a radially outwardly-extended position under the action of centrifugal force. The length of the pick-up fingers is such that, under such action, they will extend radially outwardly to an extent where they substantially skim the surface of the ground. It follows that, as the fingers contact leaves or other debris, such as twigs, and small stones, indicated by the letter [*a*] *A*, they will pick such material up and sweep the same through the spout 28 into the basket 31. This sweeping action is further aided by the blast of air created by the fan blades 8. Because of the individual suspension of the several pick-up fingers 16, the action of each one is totally independent with respect to the others thereof. Therefore, while some thereof may be prevented from being extended radially outwardly to their limit by the action of large stones or other not readily movable objects, the others will still remain effective in picking up leaves adjacent the object. This feature is further important in that it prevents injury to any of the movable elements, due to impact of the fingers with any extremely hard object.

In Fig. 6, I have shown a slightly modified form of my invention wherein the pick-up fingers 16[*a*] are secured in axially-spaced relation to each other, along the radially outer edge of the fan blade elements [16′ and] 8[′].

My invention has been thoroughly tested and found to be entirely adequate for the accomplishment of the objects above set forth; and while I have disclosed a preferred embodiment of my invention, it will be understood that the same is capable of further modification without departure from the scope and spirit of the invention as defined in the appended claims.

What I claim is:

1. A power operable leaf raking device comprising a wheel supported frame, a leaf raking and propelling structure mounted in the frame for rotation about a horizontal axis, said structure including an elongated member parallel with [and laterally spaced from] said axis, relatively rigid pick-up fingers loosely pivoted to said member at spaced points longitudinally thereof for universal swinging movements relative thereto and for radial movements relative to said axis, and power means supported by said frame and having an operative driving connection with said structure.

2. The structure according to claim 1, wherein said member comprises a fan blade operatively connected to said structure and having its center *of rotation* in said axis, and said blade in cross section thereof being disposed generally radially of said axis and being slightly curved in the direction of rotation of said structure.

3. A power operable leaf raking device comprising a wheel supported frame, a leaf raking and propelling structure mounted in the frame for rotation about a horizontal axis, said structure including a pair of elongated members parallel with and in laterally spaced relation to said axis on opposite sides and in a plane thereof, pick-up fingers loosely pivoted to each of said members at spaced points longitudinally thereof for universal swinging movements relative thereto and for radial movements relative to said axis, said structure further including elongated fan blades parallel with said members and disposed therebetween circumferentially of said axis, a motor supported by said frame, and a drive connection between the motor and said structure for imparting rotation thereto.

4. A power operable leaf raking device comprising a wheel supported frame, a leaf raking and propelling structure rotatably supported in the frame, said structure including a horizontally disposed shaft having its opposite ends journalled in the frame, a pair of elongated members parallel with and in laterally spaced relation to said shaft at opposite sides thereof, pick-up fingers loosely pivoted to each of said members at spaced points longitudinally thereof for universal swinging movements relative thereto and for radial movements relative to said shaft, a plurality of elongated fan blades supported by said shaft in parallel relation thereto and to said members, said blades being disposed between said members circumferentially of said shaft, a pulley supported by said shaft, a motor supported on said frame, and having a pulley connected thereto, and a belt operatively engaged with said pulleys.

5. The structure according to claim 4, together with a leaf confining hood surrounding the upper major portion of said structure, a leaf collecting basket supported by said frame rearwardly of said structure, and a leaf conducting throat communicating with said hood and said basket.

*6. For use with a power driven leaf raking device including a ground wheel supported frame having a rotatable raking member mounted thereon for operations relative to the ground, said raking member comprising an elongated rotatable structure having portions which are concentric with the axis of rotation and supported at its ends for rotation about said axis, and a plurality of relatively rigid leaf pick-up fingers loosely pivoted on said portion for universal swinging movements relative thereto and for radial movements relative to said axis.*

*7. The structure according to claim 6 wherein the elongated rotatable structure comprises a relatively rigid bar having longitudinal series of eyes projecting radially therefrom, and a series of relatively rigid leaf pick-up fingers each having an eye at one end loosely interlinked with a corresponding eye of said series of eyes on said bar.*

*8. The structure according to claim 6 wherein the elongated rotatable structure includes elon-*

*gated fan blades extending radially of said structure for a lesser extent than that of said fingers.*

CLAUDE S. REITAN.

REFERENCES CITED

The following references are of record in the file of this patent or the original patent:

UNITED STATES PATENTS

| Number | Name | Date |
|---|---|---|
| 1,173,485 | Coldwell | Feb. 29, 1916 |
| 1,336,257 | Muzzy | Apr. 6, 1920 |
| 1,507,317 | Laberge | Sept. 2, 1924 |
| 1,546,088 | Landon | July 14, 1925 |
| 1,870,932 | Sternemann | Aug. 9, 1932 |
| 1,939,385 | Burr | Dec. 12, 1933 |
| 2,160,275 | Magee et al. | May 30, 1939 |
| 2,341,486 | Swertfeger | Feb. 8, 1944 |
| 2,481,652 | Fort | Sept. 13, 1949 |
| 2,504,365 | Wallace | Apr. 18, 1950 |

FOREIGN PATENTS

| Number | Country | Date |
|---|---|---|
| 666,093 | Germany | Oct. 11, 1938 |